(12) United States Patent
Jiang

(10) Patent No.: US 6,857,018 B2
(45) Date of Patent: Feb. 15, 2005

(54) SYSTEM, METHOD AND COMPUTER SOFTWARE PRODUCTS FOR NETWORK FIREWALL FAST POLICY LOOK-UP

(76) Inventor: Dongyi Jiang, 2383 Bering Dr., San Jose, CA (US) 95131

( * ) Notice: Subject to any disclaimer, the term of this patent is extended or adjusted under 35 U.S.C. 154(b) by 737 days.

(21) Appl. No.: 09/919,757

(22) Filed: Aug. 1, 2001

(65) Prior Publication Data

US 2002/0032773 A1 Mar. 14, 2002

Related U.S. Application Data

(60) Provisional application No. 60/221,823, filed on Jul. 31, 2000.

(51) Int. Cl.[7] .................. G06F 15/173; G06F 15/16
(52) U.S. Cl. .................. 709/225; 709/229; 713/201
(58) Field of Search .................. 709/225, 229, 709/249; 713/201

(56) References Cited

U.S. PATENT DOCUMENTS 6,308,218 B1 * 10/2001 Vasa .................. 709/238
2002/0038380 A1 * 3/2002 Brawn et al. .................. 709/238

\* cited by examiner

Primary Examiner—Frantz B. Jean
(74) Attorney, Agent, or Firm—Bo-In Lin

(57) ABSTRACT

The present inventions provide a method for processing a table that includes a plurality of table entries with each entry providing data for defining a plurality of multiple-dimensional spaces. The method includes steps of A) assigning an ordered sequence number as a table entry counter ip to each of the table entries. B) Fragmenting the multiple-dimensional spaces into order spatial ranges and assigned each of the spatial ranges with a sequential spatial range-numbers. C) Forming multiple-dimensional range-spaces by employing the sequential spatial range-numbers as coordinates and assigning an associated table entry counter ip to each block defined by the spatial range-number coordinates for providing an index for correlating each of the sequential spatial range-numbers to the each of the table entry.

8 Claims, 6 Drawing Sheets

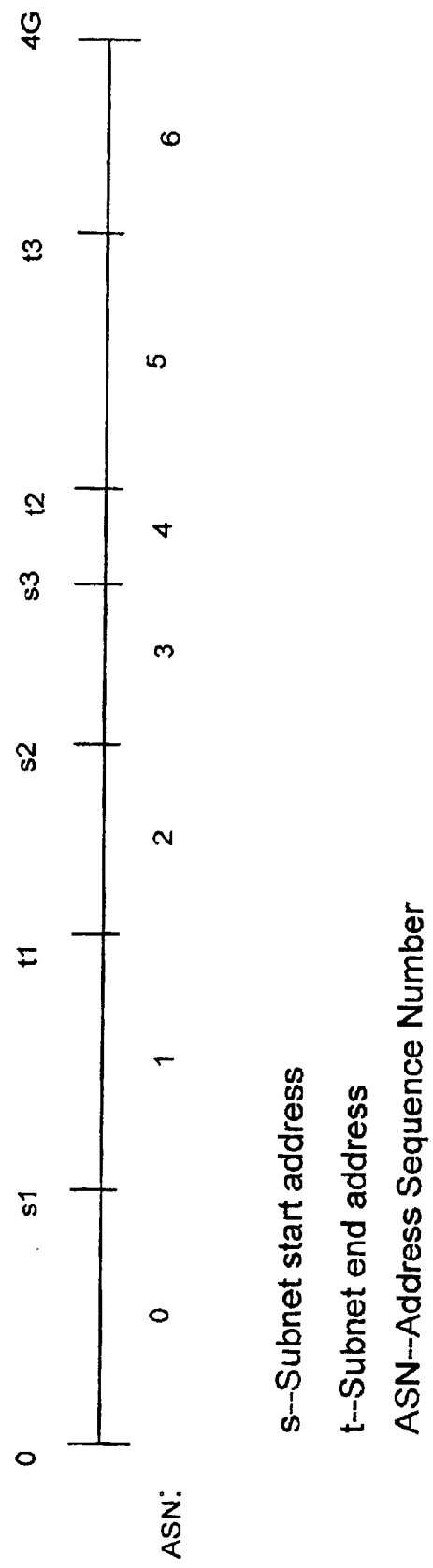
Figure 2 IP Segmentation

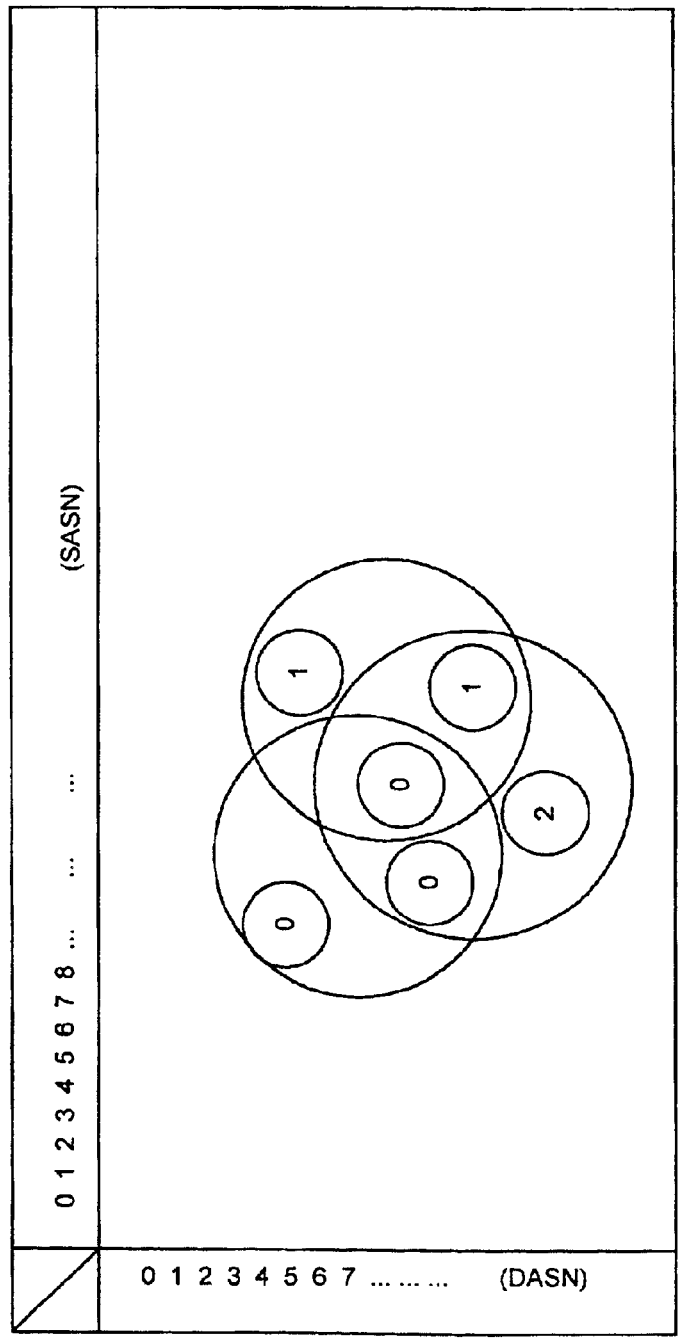
Figure 3 SDAMT-Source and Destination Address Mapping Table

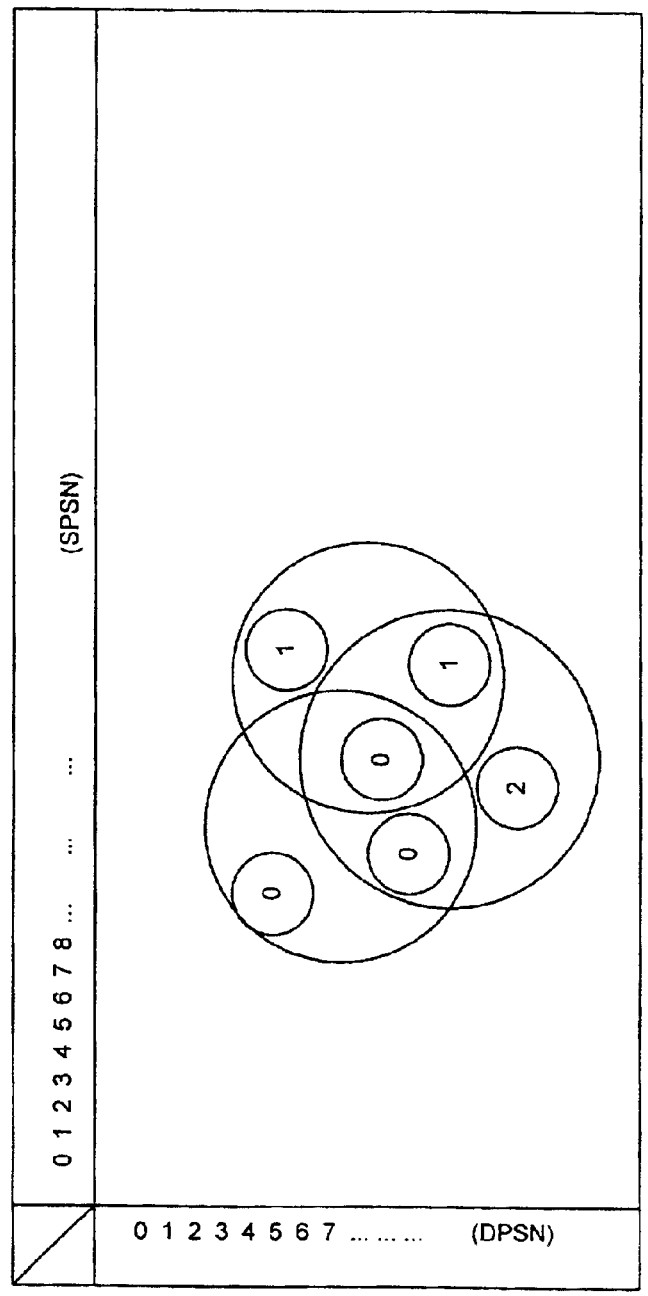
Figure 4 SDPMT-Source and Destination Port Mapping Table

| Port Mapping Number \ IP Address Mapping Number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 15 | | | | | | | | | | | | | | | |
| 14 | | | | | | | | | | | | | | | |
| 13 | | | | | | | | | | | | | | | |
| 12 | | | | | | | | | | | | | | | |
| 11 | | | | | | | | | | | | | | | |
| 10 | | | | | | | | | | | | | | | |
| 9 | | | | | | | | | | | | | | | |
| 8 | | | | | | | | | | | | | | | |
| 7 | | | | | | | | | | | | | | | |
| 6 | | | | | | | | | | | | | | | |
| 5 | | | | | | | | | | | | | | | |
| 4 | | | | 4 | | | | | | | | | | | |
| 3 | | | 3 | | | | | | | | | | | | |
| 2 | 2 | 2 | | 4 | | | | | | | | | | | |
| 1 | 1 | | 3 | | | | | | | | | | | | |

IP Address Mapping Number

Figure 5C Policy Mapping Table

SYSTEM, METHOD AND COMPUTER SOFTWARE PRODUCTS FOR NETWORK FIREWALL FAST POLICY LOOK-UP

This Application claims a Priority Date of Jul. 31, 2000, benefited from a previously filed Provisional Application 60/221,823 filed on Jul. 31, 2000 by the same Applicant of this Patent Application.

BACKGROUND OF THE INVENTION

1. Field of the Invention

The present invention relates to computer network security. More particularly, this invention is related to fast table-lookup algorithms of multiple-dimensional sequential data array for broad ranges of applications. The applications may include firewall, i.e., a combination of computer hardware and software for selectively accepting network data communications and rejecting unacceptable data transmissions to safeguard a computer network based on a predefined policy table.

2. Descriptions of the Reference Art

As network communications become more wide spread through the use of the Internet systems, many technical challenges are encountered by those of ordinary skill in the art to deal with the issues of network security. One specific challenge is to carry out the tasks of differentiating legitimate and illegitimate accesses to a protected network system effectively and expeditiously. As the amount of data transmitted over the Internet and the sources and destinations of the data transmissions are increased exponentially, the speed and accuracy in carrying out the tasks of legitimacy differentiation becomes critically important. On the one-hand higher speed is required in order to process large of data transmissions. On the other hand, due to the open and unrestricted nature of transmitting data to any and all designated destinations over the Internet, all network systems now become more vulnerable and exposed to illegitimate accesses and attacks.

In a general term, an Internet is a network of networks with a global collection of interconnected local, mid-level, and wide-area networks that use the Internet Protocol (IP) as the network layer protocol. Whereas the Internet embraces many local- and wide-area networks, a given local- or wide-area network may or may not form part of the Internet. For purposes of the present specification, a "wide-area network" (WAN) is a network that links at least two LANs over a wide geographical area via one or more dedicated connections. The public switched telephone network is an example of a wide- area network. A local-area network (LAN) is a network that takes advantage of the proximity of computers to typically offer relatively efficient, higher speed communications than wide-area networks. In addition, a network may use the same underlying technologies as the Internet. Such a network is referred to herein as an "Intranet," an internal network based on Internet standards. Because the Internet has become the most pervasive and popularly employed open networking standard, significant economic benefits are achieved by applying a same Internet standard in the internal networks. For these reasons, corporate Intranets have become a strong driving force in the marketplace of network products and services.

As the Internet and its underlying technologies have become increasingly familiar, attention has become focused on Internet security and computer network security in general. With unprecedented access to information, it has also come unprecedented opportunities to gain unauthorized access to data, change data, destroy data, make unauthorized use of computer resources, interfere with the intended use of computer resources, etc. As experience has shown, the frontier of cyber-space has its share of scofflaws, resulting in increased efforts to protect the data, resources, and reputations of those embracing Intranets and the Internet. Firewalls are intended to shield data and resources from the potential ravages of computer network intruders. In essence, a firewall functions as a mechanism, which monitors and controls the flow of data between two networks. All communications, e.g., data packets, which flow between the networks in either direction, must pass through the firewall; otherwise, security is circumvented. The firewall selectively permits the communications to pass from one network to the other, to provide bi-directional security.

Ideally, a firewall would be able to prevent any and all security breaches and attacks. Although absolute security is indeed a goal to be sought after, due to many variables (e.g., physical intrusion into the physical plant) it may be difficult to achieve. However, in many instances, it is of equal if not greater importance to be alerted to an attack so that measures may be taken to thwart the attack or render it harmless, and to avoid future attacks of the same kind. Hence a firewall, in addition to security, should provide timely information that enables attacks to be detected. Firewalls have typically relied on some combination of two techniques affording network protection: packet filtering and proxy services.

Packet filtering is the action a firewall takes to selectively control the flow of data to and from a network. Packet filters allow or block packets, usually while routing them from one network to another (often from the Internet to an internal network and vice versa). To accomplish packet filtering, a network administrator establishes a set of rules that specify what types of packets (e.g., those to or from a particular IP address or port) are to be allowed to pass and what types are to be blocked. Packet filtering may occur in a router, in a bridge, or on an individual host computer.

Packet filters are typically configured in a "default permit or denial stance", i.e., that which is not expressly prohibited/permitted is permitted/prohibited. In order for a packet filter to prohibit potentially harmful traffic, it must know what the constituent packets of that traffic look like. However, it is virtually impossible to catalogue all the various types of potentially harmful packets and to distinguish them from benign packet traffic. The filtering function required to do so is too complex. Hence, while most packet filters may be effective in dealing with the most common types of network security threats, this methodology presents many chinks that an experienced hacker may exploit. The level of security afforded by packet filtering, therefore, leaves much to be desired.

Recently, a further network security technique termed "stateful inspection" has emerged. Stateful inspection performs packet filtering not on the basis of a single packet, but on the basis of some historical window of packets on the same port. Although stateful inspection may enhance the level of security achievable using packet filtering, it is as yet relatively unproven. Furthermore, although an historical window of packets may enable the filter to more accurately identify harmful packets, the filter must still know what it is looking for. Building a filter with sufficient intelligence to deal with the almost infinite variety of possible packets and packet sequences is liable to prove an exceedingly difficult task.

The other principal methodology used in present-day firewalls is proxies. In order to describe prior-art proxy-based firewalls, some further definitions are required. A "node" is an entity that participates in network communications. A sub-network is a portion of a network or a physically independent network that may share network addresses with other portions of the network. An intermediate system is a node that is connected to more than one subnetwork and that has the role of a router for forwarding data from one subnetwork to the other.

A proxy is a program, running on an intermediate system, that deals with servers (e.g., Web servers, FTP servers, etc.) on behalf of clients. Clients, e.g. computer applications that are attempting to communicate with a network that is in protected by a firewall, send requests for connections to proxy-based intermediate systems. Proxy-based intermediate Systems relay approved client requests to target servers and relay answers back to clients.

Proxies require either custom software (i.e., proxy-aware applications) or custom user procedures in order to establish a connection. Using custom software for proxying presents several problems. Appropriate custom client software is often available only for certain platforms and the software available for a particular platform may not be the software that users prefer. Furthermore, using custom client software, users must perform extra manual configuration to direct the software to contact the proxy on the intermediate system. With the custom procedure approach, the user tells the client to connect to the proxy and then tells the proxy which host to connect to. Typically, the user will first enter the name of a firewall that the user wishes to connect through. The firewall will then prompt the user for the name of the remote host the user wishes to connect to. Although this procedure is relatively simple in the case of a connection that traverses only a single firewall, as network systems grow in complexity, a connection may traverse several firewalls. Establishing a proxied connection in such a situation starts to become a confusing maze, and a significant burden to the user, since the user must know the route the connection is to take. Furthermore, since proxies must typically prompt the user or the client software for a destination using a specific protocol, they are protocol-specific. Separate proxies are therefore required for each protocol that is to be used.

In general, network firewalls employ filter rules or policies to police network communication. In such implementation, a data packet is examined and checked with fire filter policy rules. In essence, the policy lookup in the network firewall is to find an efficient way to map a five-dimensional space DA, SA, DP, SP and protocol, to one dimension policy space. Historically, most firewalls use linear search algorithms. These algorithms are very time consuming and with O(N) as the upper bound of searching time and the searching time increase linearly as the Policy List growing.

Therefore, a need still exits in the art to provide effective method to enable a person of ordinary skill in the art to effectively differentiate allowable/disallowable network accesses with high speed and accuracy to resolve these difficulties. Specifically, the method must be conveniently adaptable to computer implementation. It is further desirable that the efficiency and accuracy can be indexed as ordered lists for conveniently sorted, updated, and reorganized when there are configuration changes of a network systems.

SUMMARY OF THE PRESENT INVENTION

It is the object of the present invention to provide a new and improved method to effectively identify a policy-table allowable data communication received from a network by employing a multiple-dimensional spatial indexing and mapping methods for speed and accuracy improvements. By systematically converting address and port numbers of a policy table into sequential numbers and by mapping the sequential number to policy entry-counters, lookup efficiency is greatly improved through traveling down binary tress of port and address sequential numbers. Additionally, performance of actual policy-number identification is made through mapping via consolidated and indexed multiple dimensional spaces. Therefore, the difficulties and limitations as discussed above commonly encountered in the conventional techniques are resolved.

In one aspect of the invention, a fast policy lookup (FPL) process is implemented. The use of the FPL in computer systems and firewall software products improves the speed of policy (rule) look-up because the table lookup is now carried out in a systematic way according to an ordered sequence. In a preferred embodiment, the FPL divides the two IP addresses (DA, SA) and the two Port Numbers (DP, SP) spaces into non-overlapped segments according to the address book. More precisely, according to the addresses used in the Policy List and the Service Type List. The original four-dimensional space is now reduced to a two-dimensional space wherein the two-dimensional space is also indexed according to a policy table entry number and then combined into a two-dimensional policy table. Consolidations through index mapping of lists defined in multi-dimensional spaces are employed to simplify the table lookup processes.

A preferred embodiment of this invention discloses a method for processing a policy table comprising a plurality of policy-table entries. Each entry comprises data for defining a plurality of destination address ranges, a source address ranges, a destination port group and a source port group. The method includes steps of A) assigning an ordered sequence number as a policy-table entry counter ip to each of the policy table entries. B) Fragmenting the destination address ranges and the source address ranges listed in the policy table entries into a plurality of a sequentially-ordered destination address segments and source address segments respectively and each segment is assigned with a sequential segment number thus generating a set of source address sequence numbers (SASN) and a set of destination address sequence numbers (DASN). C) forming a source-destination address mapping table (SDAMT) comprising a plurality of SDAMT table entries for each pair of SASN and DASN wherein each of the SDAMT table entries is provided with a policy-table entry counter ip corresponding to a first policy table entry wherein the SASN and DASN being listed. D) fragmenting the destination port groups and the source port groups listed in the policy table entries into a plurality of a sequentially-ordered destination port segments and source port segments respectively and each segment is assigned with a sequential segment number thus generating a set of source port sequence numbers (SPSN) and a set of destination port sequence numbers (DPSN). And E) forming a source-destination port mapping table (SDPMT) comprising a plurality of SDPMT table entries for each pair of SPSN and DPSN wherein each of the SDPMT table entries is provided with a policy-table entry counter ip corresponding to a first policy table entry wherein the SPSN and DPSN being listed.

The invention also discloses a method for processing a table comprising a plurality of table entries with each entry providing data for defining a plurality of multiple-dimensional spaces. The method includes steps of A) assigning an ordered sequence number as a table entry counter ip to each of the table entries. B) Fragmenting the multiple-dimensional spaces into order spatial ranges and assigned each of the spatial ranges with a sequential spatial range-numbers. C) Forming multiple-dimensional range-spaces by employing the sequential spatial range-numbers as coordinates and assigning an associated table entry counter ip to each block defined by the spatial range-number coordinates for providing an index for correlating each of the sequential spatial range-numbers to the each of the table entry.

These and other objects and advantages of the present invention will no doubt become obvious to those of ordinary skill in the art after having read the following detailed descriptions of the preferred embodiment that is illustrated in the various drawing figures.

BRIEF DESCRIPTION OF THE DRAWINGS

FIG. 2 shows Internet Protocol address and port number segmentation;

FIG. 3 shows SDAMT-source and destination address mapping table;

FIG. 4 shows SDPMT-source destination port mapping table.

FIGS. 5A to 5C illustrate process of employing the table entries of the SDAMT, and SDPMT to form a policy mapping table of FIG. 5C.

DETAILED DESCRIPTION OF THE METHOD

Reference will now be made in detail to the preferred embodiments of the invention while the invention will be described in conjunction with the preferred embodiments, however, it is not the intent of the Applicant to limit the scope of the invention to these embodiments. On the contrary, the scope of the invention is intended to cover alternatives, modifications and equivalents, which may be included within the spirit and scope of the invention. As will be appreciated by one of skill in the art, the present invention may be embodied as methods, systems or computer software program products. Software written within the scope of the present invention may be stored in some form of computer readable medium, such as memory, or hard-drive, CD-ROM. Furthermore, the software of the invention may be transmitted over a network and executed by a processor in a remote location. The software may also be embedded in the computer readable medium of hardware, such as a network gateway device or a network card.

Figure 1:
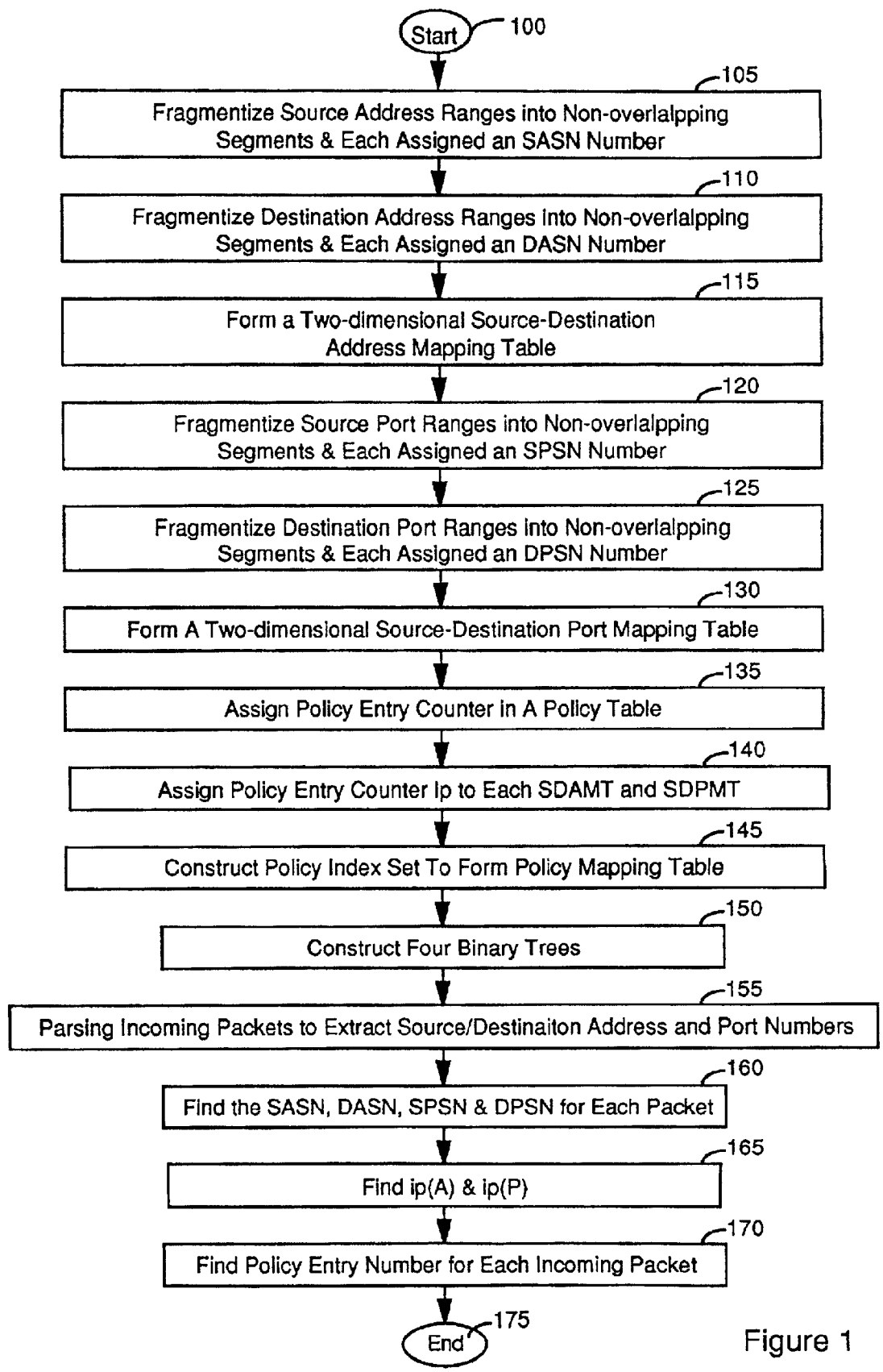
FIG. 1 is a flow chart showing the processes of a fast policy lookup method disclosed by this invention.

Referring to FIG. 1 for carrying out a policy-table lookup process according to the method of this invention. A policy-table includes a plurality of policy entries defining the acceptable incoming packets allowable for the firewall-protected network to receiving into the system as input packets. Each of these policy entries includes three sets of information: 1) a source subnet defined by a range of source IP addresses (SA) and a destination subnet defined by a range of destination IP address (DA). 2) A source port group defined by a range of port numbers (SP) and a destination port group defined by a range of port numbers (DP). And, 3) a protocol type. The protocol type has several choices, e.g., TCP/IP or UDP/IP. For the purpose of this invention, the protocol types provided in the entries of the policy-table are irrelevant when carrying out the table-lookup process for differentiating the policy-table allowable packets.

Referring to FIG. 1 again, the policy-table lookup process begins (step 100) with a process to first organize the policy table into multiple dimensional spaces for the purpose of establishing an indexing system related to each entry of the policy table. The process begins by sequentially examining every entry of the policy table. A policy table generally includes a list of policy entries and each entry is typically represented by:

{<Destination Subnet, Source Subnet>, <Destination Port, Source Port>, Protocol type,→Actions}

A range of IP addresses defines the subnet and a range of port numbers defines the port group as that provided in each policy entry. In common network configuration, the source and destination addresses are defined by a 32-bit word and the source and port numbers are defined by a 16-bit word. Therefore, there can be $2^{32}$ source and destination addresses and $2^{16}$ source and destination ports.

The policy table is organized into indexed tables by a step of fragmentation of the Internet Protocol (IP) source address (SA) into non-overlapping segments (step 105) and fragmentation of the destination addresses (DA) into non-overlapping segments (step 110). Referring to FIG. 2 for the fragmentation process of the one-dimensional array of ranges of source or destination addresses or port numbers. Each entry of the policy table is examined by looking at the range of source IP addresses defined by a minimum and maximum source IP addresses. These maximum and minimum IP addresses of the source IP address-range are selected as segment separation points as that shown in FIG. 2. All the minimum and maximum addresses for all the ranges provided in the policy table are marked as separation points over the one-dimensional axis thus forming a plurality of non-overlapping segments over a one-dimension space. This same process is performed for the destination IP addresses. As that shown in FIG. 2, each segment is assigned a segment number according to an ascending sequential order start from segment number 0. A two dimensional space, represented by a two-dimensional source-destination address mapping table (SDAMT) is formed using the SA segment sequential number (SASN) as the X-axis and the DA segment sequential number (DASN) as the Y-axis (step 115). As that shown in FIG. 3, each entry of this two-dimensional SDAMPT table that represents an index value for a {SASN, DASN} pair. Identical steps are carried out by examining the source port group and the destination port group as provided in each entry of the policy table to first fragmentize and define the source port sequential number (SPSN) and destination port sequential number (DPSN) (steps 120 and 125). Then a two-dimensional source-destination port mapping table (SDPMT) is formed corresponding to a two-dimensional space with source-port sequential number (SPSN) and destination-port sequential number (DPSN) representing the X-axis and Y-axis respectively. As that shown in FIG. 4, each entry of this two-dimensional SDPMT table represents an index value for a corresponding {SPSN, DPSN) pair.

Referring to FIG. 1 again, each entry of the policy table is assigned a policy entry counter ip=1, 2, 3, . . . N, according to an ascending sequential order starting from zero (step 135) where N is the total number of policy entries in the policy table. The process continues by assign an policy entry counter ip to each table entry corresponding to every {SASN, DASN} pair in the source-destination address mapping table and each table entry corresponding every tSPSN, DPSNI pair in the source-destination port mapping table (SDPMT) (step 140). All the table entries are initially registered as "unused" before the policy entry counter ip is entered in either the SDAMT or the SDPMT tables, and each table entry in either of these two tables is entered only with the first ip counter. Once a policy entry counter ip is entered for a table entry, that table entry in either the SDAMT or SDPMT tables is assigned with one unique ip counter and will not be changed unless overwritten by other procedure when there are changes made to the policy table. A mapping process is then carried out to transform from the four dimensional space defined by four entries of ip in four tables, i.e., SDAMT and SDPMT, to another two dimensional space represented by a policy mapping table (PMT) (step 145).

Figure 5A:
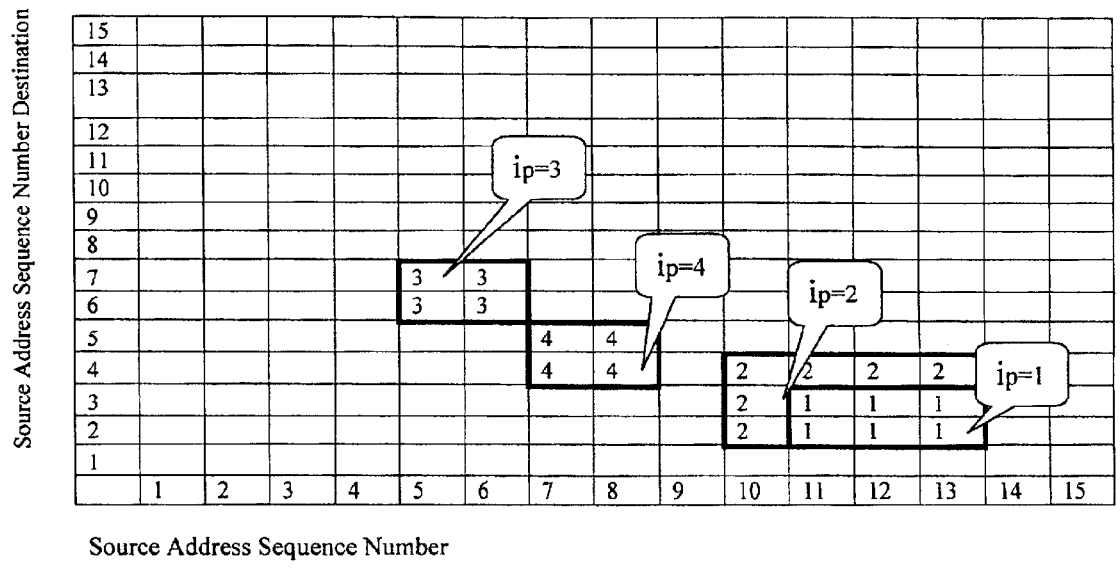
Figure 5B:
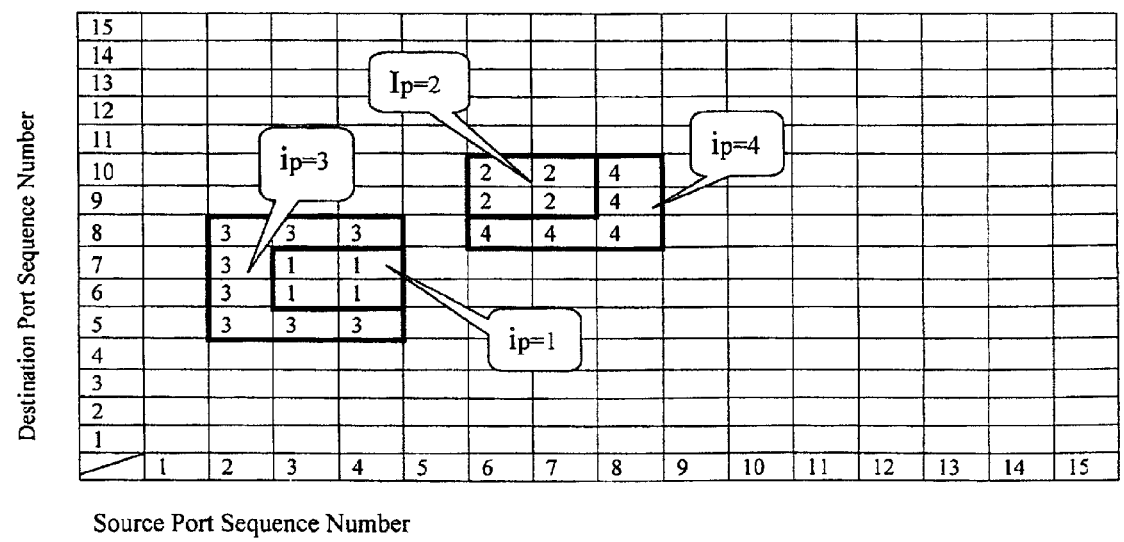

Referring to FIGS. 5A to 5C for an example for illustrating the mapping process to construct the policy-mapping table. FIGS. 5A and 5B shows the SDAMT and SDPMT entries at the time when the processes for constructing these two tables are completed for the policy entry counter ip=4. For policy entry counter ip=1, examining FIGS. 5A and 5B, there is only one combination, i.e., {1, 1}. An ip counter number, i.e., ip=1, is entered into the slot {1, 1 } of the policy mapping table (PMT). For ip =2, there are possible combinations of {1, 2 } and {2, 2}. An ip counter number, i.e., ip=2, is entered into the slot {1, 2}, and {2, 2} of the policy mapping table (PMT). For ip=3 there are possible combinations of {3, 1} and {3, 3}. An ip counter number, i.e., ip =3, is entered into the slot {3, 1}, and {3,3} of the policy mapping table (PMT). For ip=4, the possible combinations are {4, 2} and {4, 4}. An ip counter number, i.e., ip=4, is entered into the slot {4, 2}, and {4, 4} of the policy mapping table (PMT). The X-Y coordinates on the PMT table are therefore generated by combining the policy entry counters from the source-destination address mapping table (SDAMT) as the X-coordinate, and the policy entry counters from the source-destination port mapping table (SDPMT) as the Y-coordinate for all policy entry counter ip=1,2, 3, . . . , N, a policy mapping table is formed. A two two-dimensional tables are mapped into a two dimensional policy mapping table as that illustrated in FIG. 5C.

Referring back to FIG. 1 again, for the purpose of effectively conducting a "fast policy lookup" process, four "balanced binary trees" are structured (step 150). These four binary trees are a source address tree, a destination address tree, a source-port tree and destination-port tree. These balanced binary trees provide the benefits that the table-lookup processes can be more expeditiously completed because the processes are performed in a more structured, organized and balanced manner. The search time is reduced from O(N) for the unstructured array to O(lnN) when balanced binary trees are implemented. Suppose that there are N source and destination addresses and M source and destination port, the process generally starts from a root represented by a source/destination address sequence number of N/2 and source/destination port number of M/2. Each binary tree starts with a root N/2 or M/2, each having two branches having the source-destination address and port sequence numbers starting from [(N/2-1), (N/2+1)] and [(M/2-1), (M/2+1)] respectively. In receiving an incoming packet, the header of the packet is parsed to get the source/destination addresses and source/destination port number (step 155). These address and port number are then applied to travel down the four binary trees to find the source/destination address sequence numbers, i.e., SASN and DASN, and the source-destination port sequence number, i.e., SPSN and DPSN (step 160). Using the SASN and DASN as X-Y coordinates, a policy entry counter ip(A) is determined from the SDAMT as that shown in FIG. 5A. Using the SFSN and DPSN as X-Y coordinates, a policy entry counter ip(P) is determined from the SDPMT as that shown in FIG. 5B (step 165). These two policy entry counter numbers ip(A) and ip(P) are then used as X-Y coordinates to lookup the final policy entry counter number from the policy mapping table as that shown in FIG. 5C (step 170).

To further summarize the processing steps of this invention, the following descriptions present a framework to outline a processing flow of the invention.
First, two tables are generated:
    SDAMT-Source and Destination Address Mapping Table
    SDPMT-Source and Destination Port Mapping Table
Second, the 2-dimension space resulted from the previous step is transformed to the final policy space by looking up the third table:
    PMT-Policy Mapping Table
There are many ways to map a given IP address to a segment. In one embodiment, this is achieved by maintaining a balanced binary tree. For the port number mapping, a direct table (65536 in size) lookup may be more efficient and feasible in some embodiments.
IP Address Fragmentation
    IP address fragmentation should be done for both source IP address space and destination IP address space respectively. The methods for carrying out IP address space fragmentation are exactly the same. A fragmentation of the source IP address space is described below as an example.
    For each source sub-net appeared in the policy list, we use its two boundary IP addresses as the separating point in the IP space, keep doing this for every entries in the Policy List. When this is finished, we assign each segment a sequence number in the ascend order starting from 0. (See FIG. 1)
Port Number Fragmentation
    The principle of Port Number Fragmentation is quite similar to that of IP address fragmentation.
Setup the Tables:
    The SDAMT table is a two-dimension table with the Source Address Sequence Number (SASN) as the X-axle index and the Destination Address Sequence Number (DASN) as the Y-axle index; by retrieving this table, we can find the Address Group Number (AGN).
The SDPMT table is also a two-dimension table with the Source Port Sequence Number (SPSN) as the X axle index and the Destination Port Sequence Number (DP SN) as the Y-axle index; Similarly we can got the Port Group Number (PGN).
The PMT is a two-dimension table with the Address Group Number (AGN) as the X-axle index and Port Group Number ~GN) as the Y-axle index. From this table, we can ultimately find the policy entry.
All these 3 tables have a size of 1024*1024 Words so that it can support up to 1024 IP address fragmentation, 1024 port number fragmentation and 1024 policy entries.
Initially each entry of these three tables is marked as the mode UNUSED, Then a lookup process is carried in the policy list entry by entry to fill up these three tables. A very important principle in this process is that only the UNUSED entry is entered with a replaced entry. If an entry in the table is filled with an exiting entry, then the entry is not replaced. A policy counter is maintained. Initially it is set to zero. Each time when a new entry is processed in the policy list this counter is increased by one.
A Policy entry can be represented as following:
(<Dest. subnet, Source subnet>, <Dest. port group, Source port group>, protocol type) →Action
    For the protocol type, there are two choices TCP/IP or UDP/IP. These choices are addressed separately unrelated to this invention, but also can be handled in the same way by indexing as disclosed in this invention. For the sake of clarity, these parameters are not further described in the following descriptions: To fill up the tables, the following steps are processed:

1) Get SASNs according to the Source subnet address.
2) Get DASNs according to the destination subnet address.
3) Get SPSNs according to the source port group.
4) Get DPSNs according to the destination port group.
5) Using each (SASN, DASN) pair as the index, find the entry position in the SDAMT table, write the policy counter to these position if its status are UNUSED; record all these entry numbers (which you just write or already exist before your writing) to an AGN set.
6) Using each (SPSN, DPSN) pair as the index, find the entry position in the SDPMT table, write the policy counter to these position if the status are UNUSED; record all these entry numbers (which you just write or already exist before your writing) to a PGN set.
7) For each element AGN belongs to AGN set and each element PGN belongs to PGN set, we combine them to form a policy index set: (PGN, AGN). Then by using each of these pair as the index, find the entry position in the PMT table, write the policy counter to these positions if the status are UNUSED.
8) Get the next policy entry from the Policy List, go to step 1.

Usage of the Table
1) Parse the header of the incoming packet, get DA, SA, DP, SP.
2) Travel binary tree to get the DA and SA's Address Sequence Number (DASN and SASN).
3) Table lookup to get the DP and SP's Port Sequence Number (DPSN and SPSN).
4) Lookup table DSAMP to get Address Group Number (AGN) by using DASN and SASN.
5) Lookup table DSPMT to get Port Group Number (1)GN) by using DPSN and SPSN.
6) Lookup table PMT to get the policy number by using AGN and PGN.

A method for processing a policy-lookup for network protection by employing a policy table comprising a plurality of policy-table entries PTE(ip), where ip=1, 2, 3, . . . N and N is a positive integer representing a total number of the PTE(ip), with each PTE(ip) comprising data for defining a plurality of destination address ranges between a first destination address DA1(ip) and a second destination address DA2(ip), a source address ranges between a first source address SA1(ip) and second source address SA(ip), a destination port group ranging between a first destination port DP1(ip) and second destination port DP2(ip) and a source port group ranging between a first source port SP1(ip) and a second source port SP2(ip), the method comprising steps of A) generating an array of destination address segments by arranging ranges represented by {DA1(ip), DA2(ip)}, for ip=1, 2, 3, . . . N, according to a destination address sequential order thus generating a plurality of destination address segments S1(Idas) between first destination address A11(Idas) and second destination address A12(Idas) where Idas is a series of destination address sequence number (DASN) and Idas=1, 2, 3, . . . IIdas, and IIdas is a positive integer less than or equal to 2N−1. B) Generating an array of source address segments by arranging ranges represented by {SA1(ip), SA2(ip)}, for ip=1, 2, 3, . . . N, according to a source address sequential order thus generating a plurality of source address segments S2(Isas) between a first source address A21(Isas) and a second source address A22(Isas), where Isas is a series of source address sequence number (SASN) and Isas=1, 2, 3, . . . IIsas, and IIsas is a positive integer less than or equal to 2N−1. C) Forming a source-destination address mapping table (SDAMT) comprising a plurality of SDAMT table entries SDA(Isas, Idas) with Isas=1, 2, 3, . . . IIsas, and Idas=1, 2, 3, . . . IIdas and SD(Isas, Idas)=ip1 wherein ip1 is a policy-table entry counter of a first policy table entry wherein the S2(Isas) is included a range defined by SA1(ip1) and SA2(ip1), and the S1(Idas)is included in a range defined by DA1(ip1), DA2(ip1). D) Generating an array of destination port segments by arranging ranges represented by {DP1(ip), DP2(ip)}, for ip=1, 2, 3, . . . N, according to a destination address sequential order thus generating a plurality of destination address segments P1 (Idps) between a first destination port P11(Idps) and a second destination port P12(Idps), where Idps is a series of destination port sequence number (DPSN) and Idps=1, 2, 3, . . . IIdps, and IIdps is a positive integer less than or equal to 2N−1. E) Generating an array of source port segments by arranging ranges represented by {SP1(ip), SP2(ip)}, for ip=1, 2, 3, . . . N, according to a source address sequential order thus generating a plurality of source address segments S2(Isps) between a first source port P21(Isps) and a second source port P22(Isps), where Isps is a series of source address sequence number (SPSN) and Isps=1, 2, 3, . . . Isps, and IIsps is a positive integer less than or equal to 2N−1. And F) Forming a source-destination port mapping table (SDPMT) comprising a plurality of SDPMT table entries SDP(Isps, Idps) with Isps=1, 2, 3, . . . IIsps, and Idps=1, 2, 3, . . . IIdps and SDP(Isps, Idps)=ip2 wherein ip2 is a policy-table entry counter of a first policy table entry wherein the S2(Isps) is included a range defined by SP1(ip2) and SP2(ip2), and the S2(Idps)is included in a range defined by DP1(ip2), DP2(ip2). In a preferred embodiment, the method further includes a step of forming a policy mapping table by generating a policy-mapping table entry PMT(ip, ip) for ip=1, 2, 3, . . . , N, wherein PMT(ip3, ip4)=ip for ip=1, 2, 3, . . . , N and ip3=ip1(R1), and ip4=ip2(R2), and ip1(R1) representing all policy-table entry counters in the SDAMT within a two-dimensional range defined by {SA1(ip), SA2(ip)} and {DA1(ip), DA2(ip)}, and ip2(R2) representing all policy-table entry counters in the SDPMT within a two-dimensional range defined by {SP1(ip), SP2(ip)} and {DP1(ip), DP2(ip)}. In a preferred embodiment, the method further includes a step of forming a destination address binary tree by generating an array of tree elements each having a root destination-address and two branch destination addresses and recursively each root destination address is further assigned as a next level root destination address for generating two next-level branch destination addresses wherein a first root address is A11(R1) where R1=N/2 if N is an even number and R1 is (N+1)/2 if N is an odd number, and the two branch destination addresses are A12(R1−1) and A12(R1). Forming a source address binary tree by generating an array of tree elements each having a root source-address and two branch destination addresses and recursively each root destination address is further assigned as a next level root destination address for generating two next-level branch destination addresses wherein a first root address is A21(R1) and the two branch destination addresses are A22(R1−1) and A22(R1). Forming a destination port binary tree by generating an array of tree elements each having a root destination-port and two branch destination ports and recursively each root destination port is further assigned as a next level root destination port for generating two next-level branch destination port wherein a first root address is P11(R1) and the two branch destination ports are P12(R1−1) and P12(R1). And, forming a source port binary tree by generating an array of tree elements each having a root source-port and two branch source ports and recursively each root source port is further assigned as a next level root source port for generating two next-level branch source port wherein a first root address is P21(R1) and the two branch destination ports are P22(R1−1) and P22(R1). In a preferred embodiment, the method further includes a step of receiving an incoming packet containing data for parsing a designated destination and source addresses represented by DDA and DSA respectively, and a designated destination and source ports represented by DDP and DSP respectively. And, searching along the destination address binary tree for determining a destination address root DAR and a destination address branch DAB wherein DAB<DDA<DAR and determining a destination address sequence number DASN (DDA) for the DDA. Searching along the source address binary tree for determining a source address root SAR and a source address branch SAB wherein SAB<DSA<DAR and determining a source address sequence number SASN (DSA) for the DSA. Searching along the destination port binary tree for determining a destination port root DPR and a destination port branch DPB wherein DPB<DDP<DPR and determining a destination port sequence number DPSN (DDP) for the DDP. Searching along the source port binary tree for determining a source port root SPR and a source port branch SPB wherein SPB<DSP<DPR and determining a source port sequence number SPSN(DSP) for the DSP. And, applying the DASN(DDA), SASN(DSA), DPSN(DDP), and SPSN(DSP) for search the SDAMT, SDPMT, and PMT for finding a policy table entry counter ip for receiving the incoming packet only when a policy-table entry counter ip is found from the PMT.

According to the above descriptions, this invention discloses a database for use in processing a table wherein the table including a plurality of table entries each assigned with an ordered table entry counter ip and each entry providing data for defining a plurality of multiple-dimensional spaces. The database includes an array of ordered spatial ranges, e.g., destination and source address and port ranges, each assigned with an ordered spatial range number, e.g., SASN and DASN, generated from fragmenting the multiple-dimensional spaces into the array of order spatial ranges. The database further includes a multiple-dimensional table, e.g., SDAMT or SDPMT. The table is generated from forming a plurality of multiple-dimensional range spaces by employing the sequential spatial range numbers as coordinates and assigning an associated table entry counter ip to each block defined by the spatial range-number coordinates for providing an index for correlating each of the sequential spatial range-numbers to the each of the table entry.

Performance Evaluation

Assume there are 1024 IP fragmentation and port number fragmentation, there is also a Policy List of 1024 entries.

A balanced binary tree is used to hold all the boundary of IP segments, then the height of the tree should be 9. To travel two of these trees we need total of 18 times compare and branch.

Since direct table lookup is applied to determine the port segment, only 2 times memory access is needed.

There are three times table lookup and that requires three times of memory access operations.

Totally, 18 compare and branch operations are performed and +5 table lookup operations are carried out.

The computational complexity of policy lockup is reduced from O(n) to O(lgn), where the n is the number of entries of the Policy List.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A method for processing a policy-lookup for network protection by employing a policy table comprising a plurality of policy-table entries PTE(ip), where ip=1, 2, 3, . . . N and N is a positive integer representing a total number of said PTE(ip), with each PTE(ip) comprising data for defining a plurality of destination address ranges between a first destination address DA1(ip) and a second destination address DA2(ip), a source address ranges between a first source address SA1(ip) and second source address SA(ip), a destination port group ranging between a first destination port DP1(ip) and second destination port DP2(ip) and a source port group ranging between a first source port SP1 (ip) and a second source port SP2(ip), said method comprising steps of:

generating an array of destination address segments by arranging ranges represented by {DA1(ip), DA2(ip)}, for ip=1, 2, 3, . . . N, according to a destination address sequential order thus generating a plurality of destination address segments S1(Idas) between first destination address A11 (Idas) and second destination address A12(Idas) where Idas is a series of destination address sequence number (DASN) and Idas=1, 2, 3, . . . IIdas, and IIdas is a positive integer less than or equal to 2N−1;

generating an array of source address segments by arranging ranges represented by {SA1(ip), SA2(ip)}, for ip=1, 2, 3, . . . N, according to a source address sequential order thus generating a plurality of source address segments S2(Isas) between a first source address A21(Isas) and a second source address A22 (Isas), where Isas is a series of source address sequence number (SASN) and Isas=1, 2, 3, . . . IIsas, and IIsas is a positive integer less than or equal to 2N−1;

forming a source-destination address mapping table (SDAMT) comprising a plurality of SDAMT table entries SDA(Isas, Idas) with Isas=1, 2, 3, . . . IIsas, and Idas=1, 2, 3, . . . IIdas and SD(Isas, Idas)=ip1 wherein ip1 is a policy-table entry counter of a first policy table entry wherein said S2(Isas) is included a range defined by SA1(ip1) and SA2(ip1), and said S1(Idas)is included in a range defined by DA1(ip1), DA2(ip1);

generating an array of destination port segments by arranging ranges represented by {DP1(ip), DP2(ip)}, for ip=1, 2, 3, . . . N, according to a destination address sequential order thus generating a plurality of destination address segments P1(Idps) between a first destination port P11 (Idps) and a second destination port P12(Idps), where Idps is a series of destination port sequence number (DPSN) and Idps=1, 2, 3, . . . IIdps, and IIdps is a positive integer less than or equal to 2N−1;

generating an array of source port segments by arranging ranges represented by {SP1(ip), SP2(ip)}, for ip=1, 2, 3, . . . N, according to a source address sequential order thus generating a plurality of source address segments S2(Isps) between a first source port P21(Isps) and a second source port P22(Isps), where Isps is a series of source address sequence number (SPSN) and Isps=1, 2, 3, . . . IIsps, and IIsps is a positive integer less than or equal to 2N−1; and forming a source-destination port mapping table (SDPMT) comprising a plurality of SDPMT table entries SDP(Isps, Idps) with Isps=1, 2, 3, . . . IIsps, and Idps=1, 2, 3, . . . IIdps and SDP(Isps, Idps)=ip2 wherein ip2 is a policy-table entry counter of a first policy table entry wherein said S2(Isps) is included a range defined by SP1(ip2) and SP2(ip2), and said S2(Idps)is included in a range defined by DP1(ip2), DP2(ip2).

2. The method of claim 1 further comprising steps of:

forming a policy mapping table by generating a policy-mapping table entry PMT(ip, ip) for ip=1, 2, 3, . . . , N, wherein PMT(ip3, ip4) =ip for ip=1, 2, 3, . . . , N and ip3=ip1(R1), and ip4=ip2(R2), and ip1(R1) representing all policy-table entry counters in said SDAMT within a two-dimensional range defined by {SA1(ip), SA2(ip)} and {DA1(ip), DA2(ip)}, and ip2(R2) representing all policy-table entry counters in said SDPMT within a two-dimensional range defined by {SP1(ip), SP2(ip)} and {DP1(ip), DP2(ip)}.

3. The method of claim 1 further comprising steps of:

forming a destination address binary tree by generating an array of tree elements each having a root destination-address and two branch destination addresses and recursively each root destination address is further assigned as a next level root destination address for generating two next-level branch destination addresses wherein a first root address is A11(R1) where R1=N/2 if N is an even number and R1 is (N+1)/2 if N is an odd number, and said two branch destination addresses are A12(R1−1) and A12(R1);

forming a source address binary tree by generating an array of tree elements each having a root source-address and two branch destination addresses and recursively each root destination address is further assigned as a next level root destination address for generating two next-level branch destination addresses wherein a first root address is A21(R1) and said two branch destination addresses are A22(R1−1) and A22(R1);

forming a destination port binary tree by generating an array of tree elements each having a root destination-port and two branch destination ports and recursively each root destination port is further assigned as a next level root destination port for generating two next-level branch destination port wherein a first root address is P11(R1) and said two branch destination ports are P12(R1−1) and P12(R1); and forming a source port binary tree by generating an array of tree elements each having a root source-port and two branch source ports and recursively each root source port is further assigned as a next level root source port for generating two next-level branch source port wherein a first root address is P21(R1) and said two branch destination ports are P22(R1−1) and P22(R1).

4. The method of claim 3 further comprising steps of:

receiving an incoming packet containing data for parsing a designated destination and source addresses represented by DDA and DSA respectively, and a designated destination and source ports represented by DDP and DSP respectively; and searching along said destination address binary tree for determining a destination address root DAR and a destination address branch DAB wherein DAB<DDA<DAR and determining a destination address sequence number DASN(DDA) for said DDA;

searching along said source address binary tree for determining a source address root SAR and a source address branch SAB wherein SAB<DSA<DAR and determining a source address sequence number SASN(DSA) for said DSA;

searching along said destination port binary tree for determining a destination port root DPR and a destination port branch DPB wherein DPB<DDP<DPR and determining a destination port sequence number DPSN(DDP) for said DDP;

searching along said source port binary tree for determining a source port root SPR and a source port branch SPB wherein SPB<DSP<DPR and determining a source port sequence number SPSN(DSP) for said DSP; and applying said DASN(DDA), SASN(DSA), DPSN(DDP), and SPSN(DSP) for search said SDAMT, SDPMT, and PMT for finding a policy table entry counter ip for receiving said incoming packet only when a policy-table entry counter ip is found from said PMT.

5. A method for processing a policy table comprising a plurality of policy-table entries with each entry comprising data for defining a plurality of destination address ranges, a source address ranges, a destination port group and a source port group, said method comprising steps of:

assigning an ordered sequence number as a policy-table entry counter ip to each of said policy table entries;

fragmenting said destination address ranges and said source address ranges listed in said policy table entries into a plurality of a sequentially-ordered destination address segments and source address segments respectively and each segment is assigned with a sequential segment number thus generating a set of source address sequence numbers (SASN) and a set of destination address sequence numbers (DASN);

forming a source-destination address mapping table (SDAMT) comprising a plurality of SDAMT table entries for each pair of SASN and DASN wherein each of said SDAMT table entries is provided with a policy-table entry counter ip corresponding to a first policy table entry wherein said SASN and DASN being listed;

fragmenting said destination port groups and said source port groups listed in said policy table entries into a plurality of a sequentially-ordered destination port segments and source port segments respectively and each segment is assigned with a sequential segment number thus generating a set of source port sequence numbers (SPSN) and a set of destination port sequence numbers (DPSN); and forming a source-destination port mapping table (SDPMT) comprising a plurality of SDPMT table entries for each pair of SPSN and DPSN wherein each of said SDPMT table entries is provided with a policy-table entry counter ip corresponding to a first policy table entry wherein said SPSN and DPSN being listed.

6. A method for processing a table comprising a plurality of table entries with each entry defined data for defining a plurality of multiple-dimensional spaces, said method comprising steps of:

assigning an ordered sequence number as a table entry counter ip to each of said table entries;

fragmenting said multiple-dimensional spaces into order spatial ranges and assigned each of said spatial ranges with a sequential spatial range-numbers;

forming multiple-dimensional range-spaces by employing said sequential spatial range-numbers as coordinates and assigning an associated table entry counter ip to each block defined by said sequential spatial range-number coordinates for providing an index for correlating each of said sequential spatial range-numbers to said each of said table entry.

7. The method of claim 6 further comprising steps of:

forming a multiple dimensional table-entry counter space defined by table-entry counters as coordinates wherein a spatial space defined by said coordinates and pointed by a combination of all of said associated table entry counter ipc entered into each of said multiple-dimensional range spaces associated with said counter ip is entered with a value of a table entry counter ip.

8. A database for use in processing a table wherein said table including a plurality of table entries each assigned with an ordered table entry counter ip and each entry defined data for defining a plurality of multiple-dimensional spaces, said database comprising:

an array of ordered spatial ranges each assigned with an ordered spatial range number generated from fragmenting said multiple-dimensional spaces into said array of order spatial ranges;

a multiple-dimensional table generated from forming a plurality of multiple-dimensional range-spaces by employing sequential spatial range-numbers as coordinates and assigning an associated table entry counter ip to each block defined by said spatial range-number coordinates for providing an index for correlating each of said sequential spatial range-numbers to said each of said table entry.

* * * * *